United States Patent
Morita et al.

(10) Patent No.: US 10,468,189 B2
(45) Date of Patent: Nov. 5, 2019

(54) MULTILAYER CERAMIC CAPACITOR

(71) Applicant: TAIYO YUDEN CO., LTD., Taito-ku, Tokyo (JP)

(72) Inventors: Koichiro Morita, Takasaki (JP); Kenji Saito, Takasaki (JP)

(73) Assignee: TAIYO YUDEN CO., LTD, Tokyo (JP)

(*) Notice: Subject to any disclaimer, the term of this patent is extended or adjusted under 35 U.S.C. 154(b) by 461 days.

(21) Appl. No.: 14/805,426

(22) Filed: Jul. 21, 2015

(65) Prior Publication Data
US 2016/0035492 A1 Feb. 4, 2016

(30) Foreign Application Priority Data

Aug. 1, 2014 (JP) .................................. 2014-157395
Jun. 17, 2015 (JP) .................................. 2015-121930

(51) Int. Cl.
*H01G 4/30* (2006.01)
*H01G 4/005* (2006.01)
(Continued)

(52) U.S. Cl.
CPC ............... *H01G 4/30* (2013.01); *H01G 4/385* (2013.01); *H01G 4/12* (2013.01); *H01G 5/40* (2013.01)

(58) Field of Classification Search
CPC .......... H01G 4/228; H01G 4/30; H01G 4/005; H01G 4/12; H01G 4/224
(Continued)

(56) References Cited

U.S. PATENT DOCUMENTS 6,710,998 B1 * 3/2004 Saito .................. H01G 4/30
257/296
2006/0203420 A1 * 9/2006 Okuyama .............. H01G 4/232
361/271
(Continued)

FOREIGN PATENT DOCUMENTS

CN 86103814 A 3/1987
CN 103700500 A 4/2014
(Continued)

OTHER PUBLICATIONS

A Notification of Examination Opinions with Search Report issued by Taiwan Intellectual Property Office, dated Nov. 2, 2016, for Taiwan counterpart application No. 104123581.
A First Office Action issued by the State Intellectual Property Office of China dated Jun. 1, 2017 for Chinese counterpart application No. 201510468891.8.

*Primary Examiner* — Eric W Thomas
*Assistant Examiner* — Arun Ramaswamy
(74) *Attorney, Agent, or Firm* — Law Office of Katsuhiro Arai

(57) ABSTRACT

In some embodiments, a multilayer ceramic capacitor 10 has 23 unit capacitors UC1 to UC23, where these 23 unit capacitors UC1 to UC23 constitute: a first low-capacitance area LA1 constituted by three unit capacitors UC1 to UC3; a high-capacitance area HA constituted by 17 unit capacitors UC4 to UC20 whose unit capacitance is greater than that of the three unit capacitors UC1 to UC3; a second low-capacitance area LA2 constituted by three unit capacitors UC21 to UC23 whose unit capacitance is smaller than that of the 17 unit capacitors UC4 to UC20; a first variable-capacitance part which is present between the first low-capacitance area LA1 and high-capacitance area HA, and which includes the two adjacent unit capacitors UC3, UC4; and a second variable-capacitance part which is present between the high-capacitance area HA and second low-
(Continued)

capacitance area LA2, and which includes the two adjacent unit capacitors UC20, UC21.

20 Claims, 5 Drawing Sheets

(51) Int. Cl.
*H01G 4/12* (2006.01)
*H01G 4/224* (2006.01)
*H01G 4/228* (2006.01)
*H01G 4/38* (2006.01)
*H01G 5/40* (2006.01)

(58) Field of Classification Search
USPC .................. 361/301.4, 321.1, 321.2, 303
See application file for complete search history.

(56) References Cited

U.S. PATENT DOCUMENTS

| | | | |
|---|---|---|---|
| 2009/0002918 A1* | 1/2009 | Kawasaki | H01G 4/232 361/311 |
| 2014/0085768 A1* | 3/2014 | Saito | H01G 4/12 361/301.4 |
| 2014/0085769 A1 | 3/2014 | Ueda et al. | |
| 2015/0070818 A1 | 3/2015 | Tsuru et al. | |

FOREIGN PATENT DOCUMENTS

| | | | |
|---|---|---|---|
| JP | 2001338828 A | 12/2001 | |
| TW | 201404838 A | 2/2014 | |
| TW | 201413764 A | 4/2014 | |

* cited by examiner

[Fig. 1]
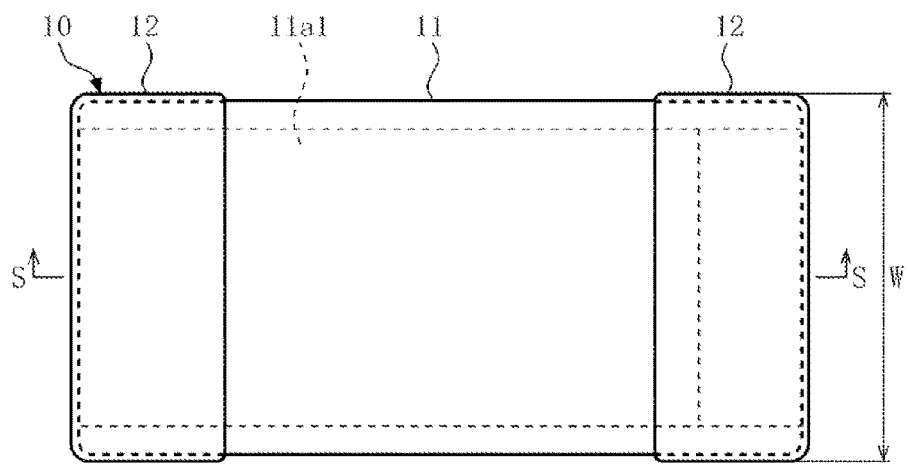
[Fig. 2]
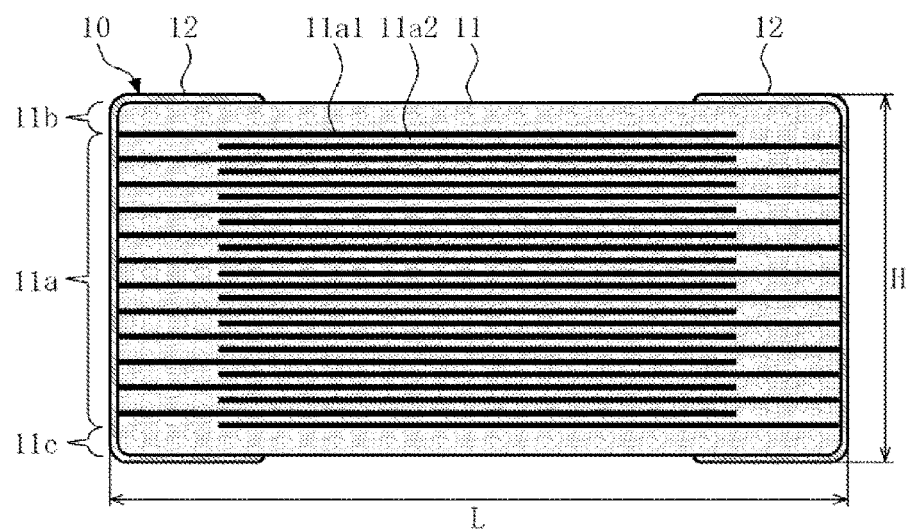
[Fig. 3]
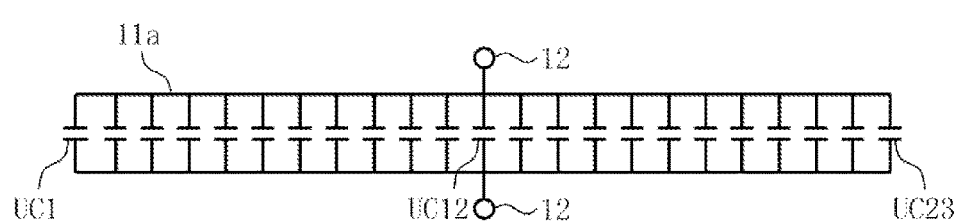

[Fig. 4]
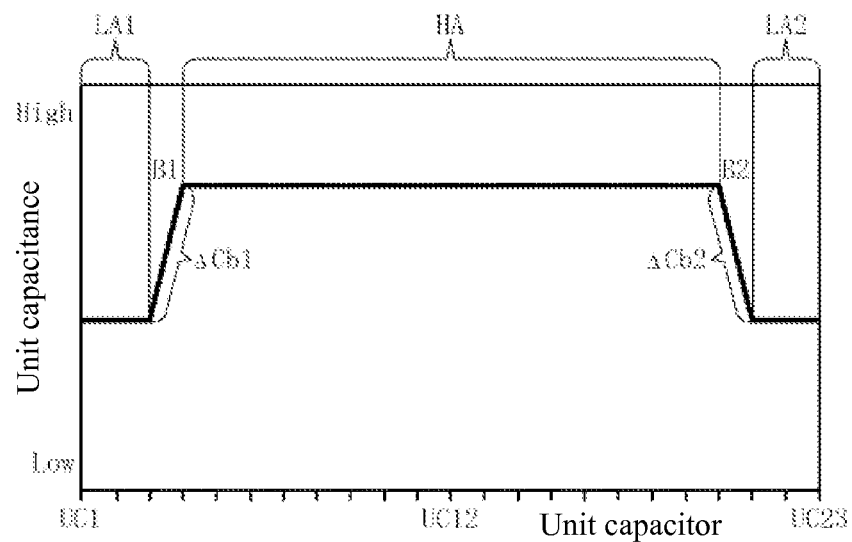
[Fig. 5]
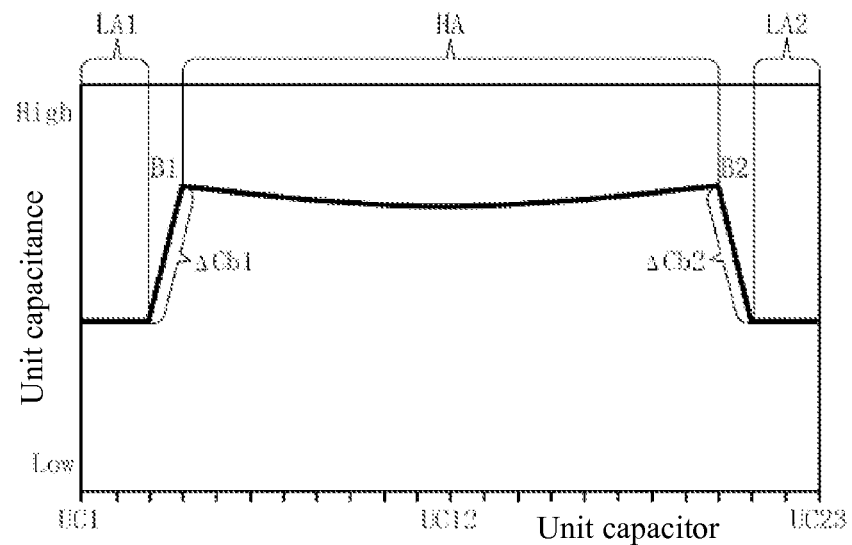

[Fig. 6]
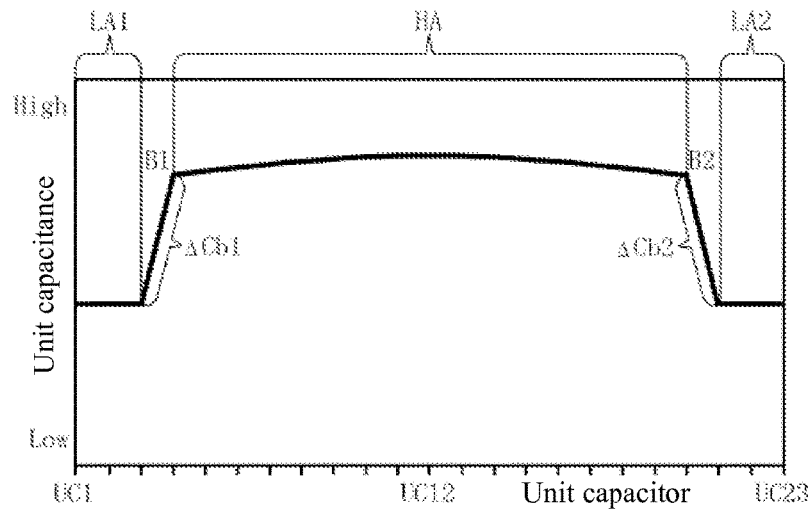
[Fig. 7]
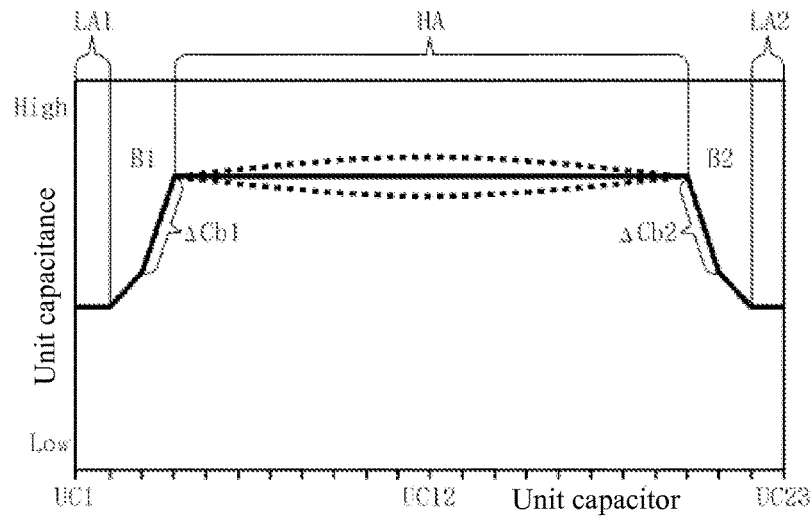
[Fig. 8]
| sample | x-y-z | ΔCb1/Cmc | ΔCb2/Cmc | Cmax/Cmin | Cst (aF) | Rst (Ω) | CRp (aΩ) |
|---|---|---|---|---|---|---|---|
| No.1 | — | — | — | 1.0 | 68664 | 20 | 1373 |
| No.2 | — | — | — | 1.1 | 53272 | 180 | 9589 |
| No.3 | 77-640-78 | 0.15 | 0.16 | 1.4 | 67736 | 180 | 12192 |
| No.4 | 78-640-78 | 0.22 | 0.22 | 1.8 | 64672 | 210 | 13581 |
| No.5 | 77-640-77 | 0.31 | 0.30 | 3.1 | 61488 | 210 | 12912 |
| No.6 | 78-640-77 | 0.53 | 0.52 | 7.0 | 59144 | 200 | 11829 |

[Fig. 9]
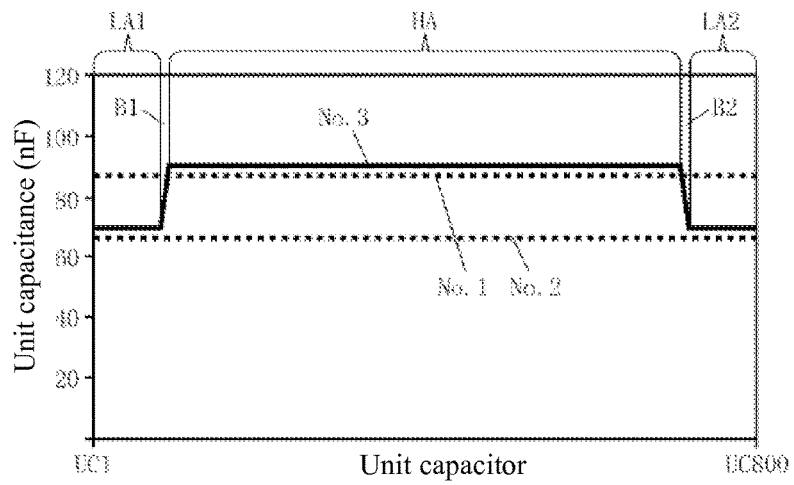
[Fig. 10]
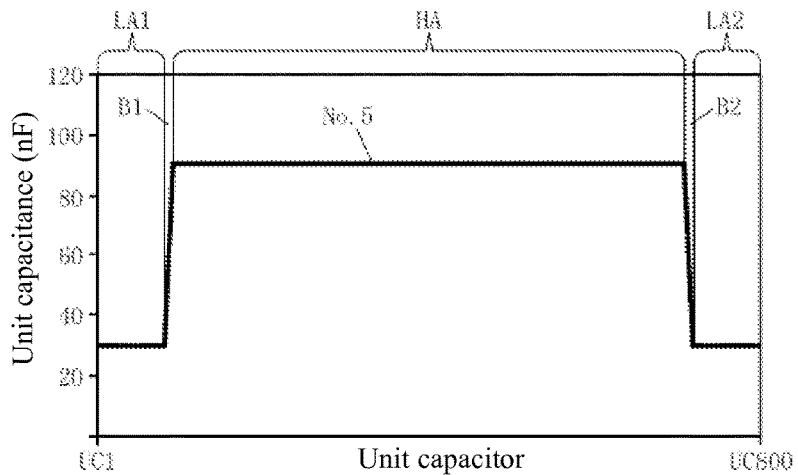
[Fig. 11]
| sample | x-y-z | ΔCb1/Cme | ΔCb2/Cme | Cmax/Cmin | (x+z)/n | Cat (nF) | Rst (Ω) | CRp (dB) |
|---|---|---|---|---|---|---|---|---|
| No.3 | 77-640-78 | 0.15 | 0.16 | 1.4 | 0.19 | 67736 | 180 | 12192 |
| No.7 | 22-752-21 | 0.23 | 0.24 | 1.9 | 0.05 | 66640 | 160 | 10562 |
| No.8 | 29-736-29 | 0.23 | 0.24 | 1.8 | 0.07 | 70320 | 180 | 12658 |
| No.9 | 118-560-117 | 0.26 | 0.26 | 1.8 | 0.30 | 63016 | 200 | 12603 |
| No.10 | 157-480-158 | 0.24 | 0.25 | 1.9 | 0.39 | 56960 | 210 | 11062 |

[Fig. 12]
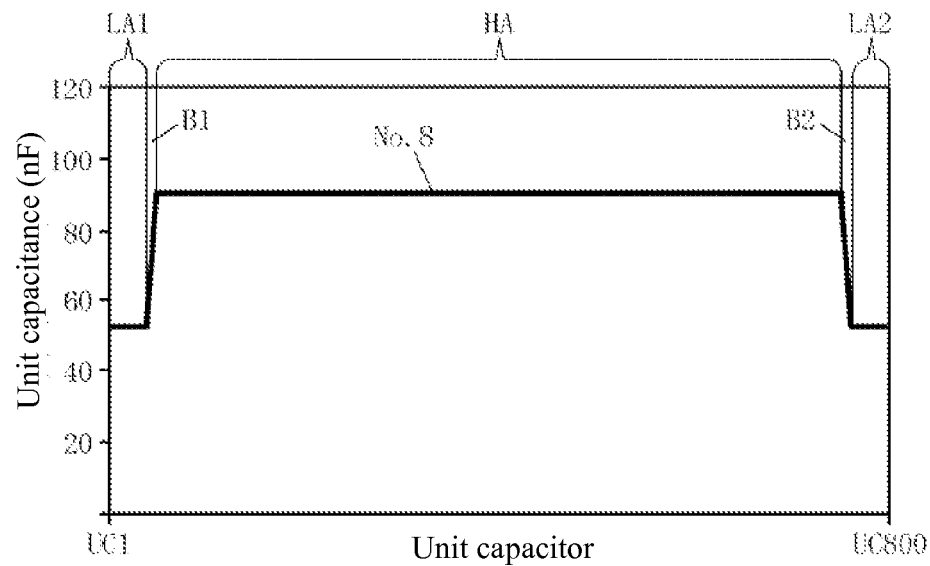
[Fig. 13]
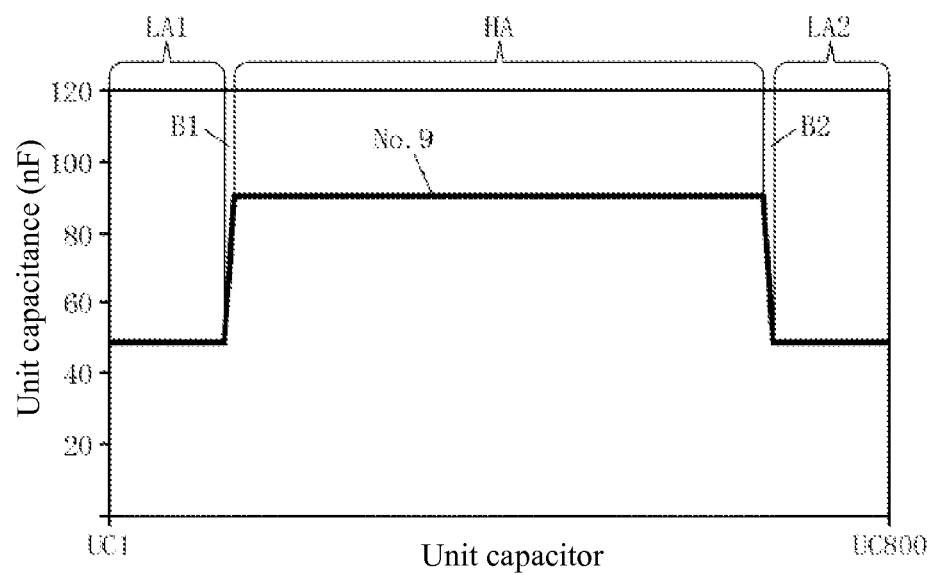

MULTILAYER CERAMIC CAPACITOR

BACKGROUND

Field of the Invention

The present invention relates to a multilayer ceramic capacitor.

Description of the Related Art

A multilayer ceramic capacitor generally has a capacitor body of laminate structure and a pair of external electrodes, and constitutes a roughly rectangular solid shape defined by its length, width, and height. The capacitance of such a multilayer ceramic capacitor is ensured by the capacitive part of the capacitor body, or specifically by an area where multiple internal electrode layers are stacked with dielectric layers sandwiched in between.

Multilayer ceramic capacitors of this type are still facing strong demand for larger capacitance, and one effective way to satisfy this demand is to reduce the thickness of the dielectric layers present between the internal electrode layers in the capacitive part. In light of the general properties of dielectric materials, however, making the dielectric layers in the capacitive part thinner to 1.0 μm or less, for example, will likely cause the insulation resistance to decrease, although doing so will increase the capacitance. In other words, since increasing the capacitance by reducing the thickness of the dielectric layers will cause the insulation resistance to decrease, the CR product (product of capacitance and insulation resistance) representing the characteristics of the multilayer ceramic capacitor may drop, even to below an acceptable range.

Patent Literature 1 cited below describes an invention aimed at preventing the CR product from dropping by limiting the grain size and volume ratio of the crystal grains contained in the dielectric layer whose thickness is 2.5 μm or less; however, accurately limiting the grain size and volume ratio of the crystal grains is difficult in consideration of the manufacturing method, which makes it difficult to improve the CR product as expected.

BACKGROUND ART LITERATURES

[Patent Literature 1] Japanese Patent Laid-open No. 2001-338828

SUMMARY

An object of the present invention is to provide a multilayer ceramic capacitor that allows for improvement of the CR product.

To achieve the aforementioned object, the multilayer ceramic capacitor proposed by the present invention has multiple internal electrode layers stacked with dielectric layers sandwiched in between, with the multiple internal electrode layers connected alternately to a pair of external electrodes, wherein, when the part constituted by two of the internal electrode layers positioned adjacent to each other in the laminating direction and the dielectric layer present between these two internal electrode layers is considered a unit capacitor, then the multilayer ceramic capacitor has an n number ($n \geq x+y+z$, where x, y and z are each an integer of 2 or greater) of unit capacitors, and these n number of unit capacitors constitute: (1) a first low-capacitance area constituted by the x number of unit capacitors; (2) a high-capacitance area constituted by the y number of unit capacitors whose unit capacitance is greater than that of the x number of unit capacitors; (3) a second low-capacitance area constituted by the z number of unit capacitors whose unit capacitance is smaller than that of the y number of unit capacitors; (4) a first variable-capacitance part which is present between the first low-capacitance area and the high-capacitance area, and which includes the two adjacent unit capacitors whose unit capacitance difference is the largest on the first low-capacitance area side; and (5) a second variable-capacitance part which is present between the high-capacitance area and the second low-capacitance area, and which includes the two adjacent unit capacitors whose unit capacitance difference is the largest on the second low-capacitance area side.

According to the present invention, a multilayer ceramic capacitor that allows for improvement of the CR product can be provided.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

DESCRIPTION OF THE SYMBOLS

10 Multilayer ceramic capacitor
11 Capacitor body
11a Capacitive part
11a1 Internal electrode layer
11a2 Dielectric layer
11b First protective part
11c Second protective part
12 External electrode
UC1 to UC23 Unit capacitor
LA1 First low-capacitance area
HA High-capacitance area
LA2 Second low-capacitance area
B1 First variable-capacitance area
Cb1 Largest unit capacitance difference in the first variable-capacitance area
B2 Second variable-capacitance area
Cb2 Largest unit capacitance difference in the second variable-capacitance area.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1 is a top view of a multilayer ceramic capacitor (basic structure) to which the present invention is applied.

FIG. 2 is a longitudinal section view of FIG. 1, cut along line S-S.

FIG. 3 is an equivalent circuit diagram of the capacitive part as shown in FIGS. 1 and 2.

FIG. 4 is a drawing showing the capacitance distribution of the unit capacitors constituting the capacitive part of the multilayer ceramic capacitor as shown in FIGS. 1 to 3 (Example 1).

FIG. 5 is a drawing showing the capacitance distribution of the unit capacitors constituting the capacitive part of the multilayer ceramic capacitor as shown in FIGS. 1 to 3 (Example 2).

FIG. 6 is a drawing showing the capacitance distribution of the unit capacitors constituting the capacitive part of the multilayer ceramic capacitor as shown in FIGS. 1 to 3 (Example 3).

FIG. 7 is a drawing showing the capacitance distribution of the unit capacitors constituting the capacitive part of the multilayer ceramic capacitor as shown in FIGS. 1 to 3 (Example 4).

FIG. 8 is a drawing showing the characteristics of Verification Sample Nos. 1 to 6.

FIG. 9 is a drawing showing the capacitance distributions of the unit capacitors constituting the capacitive parts of Sample Nos. 1 to 3 as shown in FIG. 8.

FIG. 10 is a drawing showing the capacitance distribution of the unit capacitors constituting the capacitive part of Sample No. 5 as shown in FIG. 8.

FIG. 11 is a drawing showing the characteristics of Verification Sample Nos. 7 to 10.

FIG. 12 is a drawing showing the capacitance distribution of the unit capacitors constituting the capacitive part of Sample No. 8 as shown in FIG. 11.

FIG. 13 is a drawing showing the capacitance distribution of the unit capacitors constituting the capacitive part of Sample No. 9 as shown in FIG. 11.

DETAILED DESCRIPTION OF EMBODIMENTS

First, the basic structure of a multilayer ceramic capacitor 10 to which the present invention is applied is explained by citing FIGS. 1 to 3. It should be noted that FIGS. 1 to 3 show 23 unit capacitors constituting a capacitive part 11a, as described later, for the purpose of illustration.

The multilayer ceramic capacitor 10 shown in FIGS. 1 and 2 has a capacitor body 11 of laminate structure and a pair of external electrodes 12, and constitutes a roughly rectangular solid shape defined by its length L, width W, and height H (all are reference values). This multilayer ceramic capacitor 10 satisfies the condition of Length L>Width W=Height H, but it may satisfy the condition of Length L>Width W>Height H, or the condition of Length L>Height H>Width W.

The capacitor body 11 has a capacitive part 11a constituted by 24 internal electrode layers 11a1 stacked with dielectric layers 11a2 sandwiched in between, a first protective part 11b made of dielectric material, and a second protective part 11c made of dielectric material, which are arranged in layers in the order of the first protective part 11b, capacitive part 11a, and second protective part 11c in the height direction, and also constitutes a roughly rectangular solid shape defined by its length, width, and height (all are reference values). This capacitor body 11a1 so satisfies the condition of Length>Width=Height, but it may satisfy the condition of Length>Width>Height, or the condition of Length>Height>Width, as mentioned above.

The 24 internal electrode layers 11a1 included in the capacitive part 11a each have a rectangular shape of roughly equivalent profile, and they also have a roughly equivalent thickness, respectively. Also, the 23 dielectric layers 11a2 included in the capacitive part 11a (layers sandwiched between two adjacent internal electrode layers 11a1, as well as layers that include both longitudinal ends that are not sandwiched) each have a roughly equivalent profile and constitute a rectangle greater than the profile of the internal electrode layer 11a1, and they also have a roughly equivalent thickness, respectively. The 24 internal electrode layers 11a1 are staggered in the lengthwise direction, where the edges of the odd-numbered 12 internal electrode layers 11a1 from the top as shown in FIG. 2 are electrically connected to one external electrode 12 (on the left side in FIG. 2), while the edges of the even-numbered 12 internal electrode layers 11a1 from the top as shown in FIG. 2 are electrically connected to the other external electrode 12 (on the right side in FIG. 2).

In essence, when the part of the capacitive part 11a constituted by two adjacent internal electrode layers 11a1 in the laminating direction and one dielectric layer 11a2 present between these two internal electrode layers 11a1 is considered a unit capacitor, then the capacitive part 11a forms an equivalent circuit where 23 unit capacitors UC1 to UC23 arranged in the laminating direction are connected in parallel to one pair of external electrodes 12 (refer to FIG. 3).

For the 24 internal electrode layers 11a1 included in the capacitive part 11a, preferably a good conductor whose primary constituent is nickel, copper, palladium, platinum, silver, gold, or alloy thereof, among others, can be used. Also for the 23 dielectric layers 11a2 included in the capacitive part 11a, preferably a dielectric ceramic whose primary constituent is barium titanate, strontium titanate, calcium titanate, magnesium titanate, calcium zirconate, calcium titanate zirconate, barium zirconate, or titanium oxide, among others, or more preferably a dielectric ceramic of $\varepsilon > 1000$ or class 2 (high dielectric constant group), can be used.

Each external electrode 12 is provided in a manner covering a longitudinal end face of the capacitor body 11 and parts of the four side faces adjacent to the end face. Although not illustrated, each external electrode 12 has a two-layer structure comprising a base film contacting the exterior face of the capacitor body 11 and a surface film contacting the exterior face of the base film, or a multi-layer structure where at least one intermediate film is present between the base film and surface film. The base film is formed by a baked film, for example, and for this baked film preferably a good conductor whose primary constituent is nickel, copper, palladium, platinum, silver, gold, or alloy thereof, among others, can be used. The surface film is formed by plating film, for example, and for this plating film preferably a good conductor whose primary constituent is tin, palladium, gold, zinc, or alloy thereof, among others, can be used. The intermediate film is formed by plating film, for example, and for this plating film preferably a good conductor whose primary constituent is platinum, palladium, gold, copper, nickel, or alloy thereof, among others, can be used.

Next, the capacitance distributions (Examples 1 to 4) of the 23 unit capacitors UC1 to UC23 constituting the capacitive part 11a of the multilayer ceramic capacitor 10 shown in FIGS. 1 to 3 are explained by citing FIGS. 4 to 7. It should be noted that the thick solid lines and thick broken lines shown in FIGS. 4 to 7 are approximate lines provided to show the respective capacitance distributions in an easy-to-understand manner, and not lines connecting the unit capacitances of the respective unit capacitors UC1 to UC23 in sequence (except for the first variable-capacitance part B1 and second variable-capacitance part B2 as described later).

In Examples 1 to 3 (refer to FIGS. 4 to 6), the 23 unit capacitors UC1 to UC23 constituting the capacitive part 11a form a capacitance distribution in which a first low-capacitance area LA1 constituted by three unit capacitors UC1 to UC3, a high-capacitance area HA constituted by 17 unit capacitors UC4 to UC20 whose unit capacitance is greater than that of the three unit capacitors UC1 to UC3, and a second low-capacitance area LA2 constituted by three unit capacitors UC21 to UC23 whose unit capacitance is smaller than that of the 17 unit capacitors UC4 to UC20, exist in this order in the laminating direction. The 17 unit capacitors UC4 to UC20 constituting the high-capacitance area HA may each have roughly the same unit capacitance (refer to FIG. 4), or their unit capacitances may gradually decrease toward the center in the laminating direction (refer to FIG. 5), or their unit capacitances may gradually increase toward the center in the laminating direction (refer to FIG. 6). As described earlier, the respective capacitance distributions are shown by approximate lines in Examples 1 to 3 (refer to FIGS. 4 to 6), but in reality in Example 1 (refer to FIG. 4), the unit capacitances of the three unit capacitors UC1 to UC3 constituting the first low-capacitance area LA1 may not necessarily be the same ("not necessarily be the same" refers to materially the same in some embodiments, and materially different for all or some of the unit capacitors in other embodiments); the unit capacitances of the 17 unit capacitors UC4 to UC20 constituting the high-capacitance area HA may not necessarily be the same; and the unit capacitances of the three unit capacitors UC21 to UC23 constituting the second low-capacitance area LA2 may not necessarily be the same. Also with the 17 unit capacitors UC4 to UC20 constituting the high-capacitance area HA in Example 2 (refer to FIG. 5), the unit capacitance difference between given two adjacent unit capacitors may not necessarily be the same, while with the 17 unit capacitors UC4 to UC20 constituting the high-capacitance area HA in Example 3 (refer to FIG. 6), the unit capacitance difference between given two adjacent unit capacitors may not necessarily be the same.

In these capacitance distributions, a first variable-capacitance part B1 constituted by two adjacent unit capacitors UC3, UC4 exists between the first low-capacitance area LA1 and high-capacitance area HA, while a second variable-capacitance part B2 constituted by two adjacent unit capacitors UC20, UC21 exists between the high-capacitance area HA and second low-capacitance area LA2. ΔCb1 of the first variable-capacitance part B1 indicates the largest unit capacitance difference manifesting on the first low-capacitance area LA1 side, and since the first variable-capacitance part B1 is constituted by two unit capacitors UC3, UC4, here the unit capacitance difference between the unit capacitors UC3, UC4 gives the largest unit capacitance difference ΔCb1. On the other hand, ΔCb2 of the second variable-capacitance part B2 indicates the largest unit capacitance difference manifesting on the second low-capacitance area LA2 side, and since the second variable-capacitance part B2 is constituted by two unit capacitors UC20, UC21, here the unit capacitance difference between the unit capacitors UC20, UC21 gives the largest unit capacitance difference ΔCb2. In other words, as is evident from Examples 1 to 3 (refer to FIGS. 4 to 6), the first variable-capacitance part B1 includes the two unit capacitors UC3, UC4 whose unit capacitance difference is the largest, on the positive side, of all unit capacitance differences between two adjacent unit capacitors among the 23 unit capacitors UC1 to UC23, while the second variable-capacitance part B2 includes the two unit capacitors UC20, UC21 whose unit capacitance difference is the largest, on the negative side, of all unit capacitance differences between two adjacent unit capacitors among the 23 unit capacitors UC1 to UC23.

On the other hand, in Example 4 (refer to FIG. 7), the 23 unit capacitors UC1 to UC23 constituting the capacitive part 11a form a capacitance distribution in which a first low-capacitance area LA1 constituted by two unit capacitors UC1, UC2, a high-capacitance area HA constituted by 17 unit capacitors UC4 to UC20 whose unit capacitance is greater than that of the two unit capacitors UC1, UC2, and a second low-capacitance area LA2 constituted by two unit capacitors UC22 to UC23 whose unit capacitance is smaller than that of the 17 unit capacitors UC4 to UC20, exist in this order in the laminating direction. The 17 unit capacitors UC4 to UC20 constituting the high-capacitance area HA may each have roughly the same unit capacitance (refer to the thick solid line), or their unit capacitances may gradually decrease toward the center in the laminating direction (refer to the lower thick broken line), or their unit capacitances may gradually increase toward the center in the laminating direction (refer to the upper thick broken line), just like in FIGS. 4 to 6 (Examples 1 to 3). As described earlier, the capacitance distribution is shown by approximate lines in Example 4 (refer to FIG. 7), but in reality in Example 4 (refer to FIG. 7), the unit capacitances of the two unit capacitors UC1, UC2 constituting the first low-capacitance area LA1 may not necessarily be the same; the unit capacitances of the 17 unit capacitors UC4 to UC20 constituting the high-capacitance area HA indicated by the thick solid line may not necessarily be the same; and the unit capacitances of the two unit capacitors UC22, UC23 constituting the second low-capacitance area LA2 may not necessarily be the same. Also with the 17 unit capacitors UC4 to UC20 constituting the high-capacitance area HA indicated by the lower thick broken line in Example 4 (refer to FIG. 7), the unit capacitance difference between given two adjacent unit capacitors may not necessarily be the same, while with the 17 unit capacitors UC4 to UC20 constituting the high-capacitance area HA indicated by the upper thick broken line in Example 4 (refer to FIG. 7), the unit capacitance difference between given two adjacent unit capacitors may not necessarily be the same.

In this capacitance distribution, a first variable-capacitance part B1 constituted by three continuous unit capacitors UC2 to UC4 exists between the first low-capacitance area LA1 and high-capacitance area HA, while a second variable-capacitance part B2 constituted by three continuous unit capacitors UC20 to UC22 exists between the high-capacitance area HA and second low-capacitance area LA2. ΔCb1 of the first variable-capacitance part B1 indicates the largest unit capacitance difference manifesting on the first low-capacitance area LA1 side, and since the first variable-capacitance part B1 is constituted by three unit capacitors UC2 to UC4, here the larger of the unit capacitance difference between the unit capacitors UC2, UC3 or the unit capacitance difference between the unit capacitors UC3, UC4, or specifically the unit capacitance difference between the unit capacitors UC3, UC4, gives the largest unit capacitance difference ΔCb1. On the other hand, ΔCb2 of the second variable-capacitance part B2 indicates the largest unit capacitance difference manifesting on the second low-capacitance area LA2 side, and since the second variable-capacitance part B2 is constituted by three unit capacitors UC20 to UC22, here the larger of the unit capacitance difference between the unit capacitors UC20, UC21 or the unit capacitance difference between the unit capacitors UC21, UC22, or specifically the unit capacitance difference between the unit capacitors UC20, UC21, gives the largest unit capacitance difference $\Delta Cb2$. In other words, as is evident from Example 4 (refer to FIG. 7), the first variable-capacitance part B1 includes the two unit capacitors UC3, UC4 whose unit capacitance difference is the largest, on the positive side, of all unit capacitance differences between two adjacent unit capacitors among the 23 unit capacitors UC1 to UC23, while the second variable-capacitance part B2 includes the two unit capacitors UC20, UC21 whose unit capacitance difference is the largest, on the negative side, of all unit capacitance differences between two adjacent unit capacitors among the 23 unit capacitors UC1 to UC23.

The capacitance of each unit capacitor can be adjusted by, for example, changing the amount of sintering inhibitor included in a green sheet or the like under certain conditions, and a skilled artisan in the art can readily provide such conditions, in view of the present disclosure, as a matter of routine experimentation.

Next, the specifications and manufacturing methods of Verification Sample Nos. 1 to 6 (multilayer ceramic capacitors) shown in FIG. 8 are explained.

<Specification and Manufacturing Method of Sample No. 1>

The specifications of Sample No. 1 (all dimensions are reference values) are as follows:

Length L 3200 μm, width W and height H 1600 μm;

Capacitive part 11a of thickness 1400 μm, internal electrode layer 11a1 of thickness 1.0 μm and primary constituent being nickel, dielectric layer 11a2 of thickness 0.8 μm and primary constituent being barium titanate;

Capacitive part 11a constituted by 800 unit capacitors;

First protective part 11b and second protective part 11c of thickness 100 μm and primary constituent being barium titanate; and External electrode 12 of thickness 10 μm, three-layer structure based on base film of primary constituent being nickel, intermediate film of primary constituent being copper, and surface film of primary constituent being tin, partially covering 640 μm in length of four side faces of capacitor body 11.

The manufacturing method of Sample No. 1 follows the procedure below:

Prepare a ceramic slurry containing barium titanate powder, ethanol (solvent), polyvinyl butyral (binder), and holmium oxide (sintering inhibitor, 0.5 percent by mol), and then coat carrier films with the ceramic slurry and dry the slurry to produce first green sheets;

Prepare an electrode paste containing nickel powder, terpineol (solvent), and ethyl cellulose (binder), and then print the electrode paste onto the first green sheets in zigzag or matrix patterns and dry the paste to produce second green sheets on which internal electrode layer patterns are formed;

Stack a specified number of unit sheets that have been stamped out of the first green sheets, and then thermally bond the sheets to produce an area corresponding to the second protective part 11c;

Stack a specified number of unit sheets (bearing the internal electrode layer patterns) that have been stamped out of the second green sheets, and then thermally bond the sheets to produce an area corresponding to the capacitive part 11a;

Stack a specified number of unit sheets that have been stamped out of the first green sheets, and then thermally bond the sheets to produce an area corresponding to the first protective part 11b;

Securely bond the area corresponding to the second protective part 11c, area corresponding to the capacitive part 11a, and area corresponding to the first protective part 11b, to produce an unsintered multilayer sheet;

Cut the unsintered laminated sheet into squares to produce unsintered chips corresponding to capacitor bodies 11;

Sinter the many unsintered chips in a reducing ambience or ambience of low partial oxygen pressure according to a temperature profile appropriate for barium titanate and nickel (by raising the temperature at a rate of 600° C./h) (the process includes binder removal and sintering), to produce sintered chips corresponding to capacitor bodies 11; and Apply an electrode paste (use the electrode paste for internal electrode layer) on both longitudinal ends of the sintered chips, bake the chips in the same ambience mentioned above to form a base film, and then form an intermediate film and surface film on top by means of electroplating or other plating process, to produce external electrodes 12.

<Specifications and Manufacturing Method of Sample No. 2>

The specifications of Sample No. 2 are the same as the aforementioned specifications of Sample No. 1. However, the manufacturing method of Sample No. 2 is different from the aforementioned manufacturing method of Sample No. 1 in that:

A ceramic slurry containing barium titanium powder, ethanol (solvent), polyvinyl butyral (binder), and holmium oxide (sintering inhibitor, 0.7 percent by mol) was prepared and then the ceramic slurry was coated onto carrier films and dried to produce first green sheets.

<Specifications and Manufacturing Method of Sample No. 3>

The specifications of Sample No. 3 are the same as the aforementioned specification of Sample No. 1. However, the manufacturing method of Sample No. 3 is different from the aforementioned manufacturing method of Sample No. 1 in that:

A ceramic slurry containing barium titanium powder, ethanol (solvent), polyvinyl butyral (binder), and holmium oxide (sintering inhibitor, 0.8 percent by mol) was prepared and then the ceramic slurry was coated onto carrier films and dried to produce third green sheets;

The electrode paste was printed onto the third green sheets in zigzag or matrix patterns and dried to produce fourth green sheets on which internal electrode layer patterns were formed;

A specified number of unit sheets that had been stamped out of the third green sheets were stacked and thermally bonded to produce an area corresponding to the second protective part 11c;

A specified number of unit sheets (bearing the internal electrode layer patterns) that had been stamped out of the fourth green sheets were stacked and thermally bonded, after which a specified number of units sheets (bearing the internal electrode layer patterns) that had been stamped out of the second green sheets were stacked and thermally bonded, and then a specified number of unit sheets (bearing the internal electrode layer patterns) that had been stamped out of the fourth green sheets were stacked and thermally bonded, to produce an area corresponding to the capacitive part 11a;

A specified number of unit sheets that had been stamped out of the third green sheets were stacked and thermally bonded to produce an area corresponding to the first protective part 11b; and Many unsintered chips were sintered in a reducing ambience or ambience of low partial oxygen pressure according to a temperature profile appropriate for barium titanate and nickel (by raising the temperature at a rate of 1000° C./h) (the process included binder removal and sintering), to produce sintered chips corresponding to capacitor bodies 11.

<Specifications and Manufacturing Method of Sample No. 4>

The specifications of Sample No. 4 are the same as the aforementioned specifications of Sample No. 1. However, the manufacturing method of Sample No. 4 is different from the aforementioned manufacturing method of Sample No. 3 in that:

A ceramic slurry containing barium titanium powder, ethanol (solvent), polyvinyl butyral (binder), and holmium oxide (sintering inhibitor, 0.9 percent by mol) was prepared and then the ceramic slurry was coated onto carrier films and dried to produce third green sheets.

<Specification and Manufacturing Method of Sample No. 5>

The specifications of Sample No. 5 are the same as the aforementioned specifications of Sample No. 1. However, the manufacturing method of Sample No. 5 is different from the aforementioned manufacturing method of Sample No. 3 in that:

A ceramic slurry containing barium titanium powder, ethanol (solvent), polyvinyl butyral (binder), and holmium oxide (sintering inhibitor, 1.0 percent by mol) was prepared and then the ceramic slurry was coated onto carrier films and dried to produce third green sheets.

<Specifications and Manufacturing Method of Sample No. 6>

The specifications of Sample No. 6 are the same as the aforementioned specifications of Sample No. 1. However, the manufacturing method of Sample No. 6 is different from the aforementioned manufacturing method of Sample No. 3 in that:

A ceramic slurry containing barium titanium powder, ethanol (solvent), polyvinyl butyral (binder), and holmium oxide (sintering inhibitor, 1.3 percent by mol) was prepared and then the ceramic slurry was coated onto carrier films and dried to produce third green sheets.

Next, the meanings of the characteristic items shown in FIG. 8, as well as the measurement methods of the values, etc., shown under the respective characteristic items, are explained.

The "x-y-z" column in FIG. 8 shows the number x of unit capacitors constituting the first low-capacitance area LA1, number y of unit capacitors constituting the high-capacitance area HA, and number z of unit capacitors constituting the second low-capacitance area LA2, among the 800 unit capacitors UC1 to UC800 constituting the capacitive part 11a. In addition, the "$\Delta Cb1/Cme$" column and "$\Delta Cb2/Cme$" column in FIG. 8 show the largest unit capacitance difference $\Delta Cb1$ in the first variable-capacitance part B1 divided by the average unit capacitance Cme of the 800 unit capacitors UC1 to UC800 constituting the capacitive part 11a, and the largest unit capacitance difference $\Delta Cb2$ in the second variable-capacitance part B2 divided by the same, respectively. As an added note, the largest unit capacitance difference $\Delta Cb1$ and the largest unit capacitance difference $\Delta Cb2$ represent the largest value of unit capacitance difference between two adjacent unit capacitors among the five or four unit capacitors constituting the first variable-capacitance part and the second variable-capacitance part, respectively, as explained earlier by citing Example 4 above (refer to FIG. 7). In addition, the average unit capacitance Cme is the value calculated by dividing the total sum of the measured unit capacitances of the unit capacitors UC1 to UC800, by 800. Furthermore, the "Cmax/Cmin" column in FIG. 8 shows the value calculated by dividing the largest unit capacitance Cmax among the 800 unit capacitors UC1 to UC800 constituting the capacitive part 11a, by the smallest unit capacitance Cmin. Additionally, the "Cst (nF)" column in FIG. 8 shows the capacitance of each sample, the "Rst (M$\Omega$)" column shows the insulation resistance of each sample, and the "CRp ($\Omega$F)" column shows the CR product (product of capacitance and insulation resistance) of each sample.

The values in the "x-y-z" column, "$\Delta Cb1/Cme$" column, "$\Delta Cb2/Cme$" column and "Cmax/Cmin" column in FIG. 8 are based on the results of preparing 10 samples each and then, after removing the pair of external electrodes 12 from each sample, measuring the unit capacitances of the 800 unit capacitors UC1 to UC800 using a manual prober and a LCR meter (4284A manufactured by Agilent) (averages of 10 samples each). In addition, the values in the "Cst (nF)" column in FIG. 8 are based on the results of preparing 10 samples each and then measuring the capacitance of each sample through the pair of external electrodes 12 under the condition of 1 kHz and 1 V being impressed, using a LCR meter (4284A manufactured by Agilent) (averages of 10 samples each). Furthermore, the values in the "Rst (M$\Omega$)" column in FIG. 8 are based on the results of preparing 10 samples each and then measuring the insulation resistance of each sample through the pair of external electrodes 12 under the condition of 1 V being impressed, using an insulation resistance meter (R8340A manufactured by ADC). Additionally, the values in the "CRp ($\Omega$F)" column in FIG. 8 are the results of multiplying the values in the "Cst (nF)" column in FIG. 8 and the values in the "Rst (M$\Omega$)" column in FIG. 8.

As explained later, the "x-y-z" column, "$\Delta Cb1/Cme$" column, and "$\Delta Cb2/Cme$" column are all left blank for Sample Nos. 1 and 2 in FIG. 8 because the capacitance distributions of the capacitive parts 11a of Sample Nos. 1 and 2 shown in FIG. 8 do not have the first low-capacitance area LA1, high-capacitance area HA, and second low-capacitance area LA2 unlike the capacitance distributions of the capacitive parts 11a of Sample Nos. 3 and 5.

Next, the capacitance distributions of the 800 unit capacitors UC1 to UC800 constituting the capacitive parts 11a of Sample Nos. 1 to 6 shown in FIG. 8 are explained by citing FIGS. 9 and 10.

It should be noted that the upper thick broken line in FIG. 9 is an approximate line plotting the unit capacitances (average of 10) of the 800 unit capacitors UC1 to UC800 constituting the capacitive part 11a of Sample No. 1, showing their capacitance distribution in an easy-to-understand manner. Also, the lower thick broken line in FIG. 9 is an approximate line plotting the unit capacitances (average of 10) of the 800 unit capacitors UC1 to UC800 constituting the capacitive part 11a of Sample No. 2, showing their capacitance distribution in an easy-to-understand manner. Furthermore, the thick solid line in FIG. 9 is an approximate line plotting the unit capacitances (average of 10) of the 800 unit capacitors UC1 to UC800 constituting the capacitive part 11a of Sample No. 3, showing their capacitance distribution in an easy-to-understand manner. Additionally, the thick solid line in FIG. 10 is an approximate line plotting the unit capacitances (average of 10) of the 800 unit capacitors UC1 to UC800 constituting the capacitive part 11a of Sample No. 5, showing their capacitance distribution in an easy-to-understand manner.

As is evident from FIGS. 9 and 10, the capacitance distribution of the 800 unit capacitors UC1 to UC800 constituting the capacitive part 11a forms roughly a straight line for Sample Nos. 1 and 2. This is different with Sample Nos. 3 and 5 whose capacitance distribution of the 800 unit capacitors UC1 to UC800 constituting the capacitive part 11a has the first low-capacitance area LA1, high-capacitance area HA, and second low-capacitance area LA2, in this order, in the laminating direction.

To be specific, the 800 unit capacitors UC1 to UC800 constituting the capacitive part 11a of Sample No. 3 form a capacitance distribution in which the first low-capacitance area LA1 constituted by 77 unit capacitors UC1 to UC77, the high-capacitance area HA constituted by 640 unit capacitors UC81 to UC720 whose unit capacitance is greater than that of the 77 unit capacitors UC1 to UC77, and the second low-capacitance area LA2 constituted by 78 unit capacitors UC723 to UC800 whose unit capacitance is smaller than that of the 640 unit capacitors UC81 to UC720, exist, in this order, in the laminating direction.

In this capacitance distribution, a first variable-capacitance part B1 constituted by five continuous unit capacitors UC77 to UC81 exists between the first low-capacitance area LA1 and high-capacitance area HA, while a second variable-capacitance part B2 constituted by four continuous unit capacitors UC720 to UC723 exists between the high-capacitance area HA and second low-capacitance area LA2. Although not shown in FIG. 9, the largest unit capacitance difference $\Delta Cb1$ (refer to FIG. 8) in the first variable-capacitance part B1 represents the largest value of unit capacitance difference between given two adjacent unit capacitors among the five unit capacitors UC77 to UC81 constituting the first variable-capacitance part B1, as described above. On the other hand, as described above, the largest unit capacitance difference $\Delta Cb2$ (refer to FIG. 8) in the second variable-capacitance part B2 represents the largest value of unit capacitance difference between given two adjacent unit capacitors among the four unit capacitors UC720 to UC723 constituting the second variable-capacitance part B2.

Meanwhile, the 800 unit capacitors UC1 to UC800 constituting the capacitive part 11a of Sample No. 5 form a capacitance distribution in which the first low-capacitance area LA1 constituted by 77 unit capacitors UC1 to UC77, the high-capacitance area HA constituted by 640 unit capacitors UC81 to UC720 whose unit capacitance is greater than that of the 77 unit capacitors UC1 to UC77, and the second low-capacitance area LA2 constituted by 77 unit capacitors UC724 to UC800 whose unit capacitance is smaller than that of the 640 unit capacitors UC81 to UC720, exist, in this order, in the laminating direction.

In this capacitance distribution, a first variable-capacitance part B1 constituted by five continuous unit capacitors UC77 to UC81 exists between the first low-capacitance area LA1 and high-capacitance area HA, while a second variable-capacitance part B2 constituted by five continuous unit capacitors UC720 to UC724 exists between the high-capacitance area HA and second low-capacitance area LA2. Although not shown in FIG. 10, the largest unit capacitance difference $\Delta Cb1$ (refer to FIG. 8) in the first variable-capacitance part B1 represents the largest value of unit capacitance difference between given two adjacent unit capacitors among the five unit capacitors UC77 to UC81 constituting the first variable-capacitance part B1, as described above. On the other hand, as described above, the largest unit capacitance difference $\Delta Cb2$ (refer to FIG. 8) in the second variable-capacitance part B2 represents the largest value of unit capacitance difference between given two adjacent unit capacitors among the five unit capacitors UC720 to UC724 constituting the second variable-capacitance part B2.

While not illustrated, the 800 unit capacitors UC1 to UC800 constituting the capacitive part 11a of Sample No. 4 form a capacitance distribution in which the first low-capacitance area LA1, high-capacitance area HA and second low-capacitance area LA2 exist, in this order, in the laminating direction, although the first low-capacitance area LA1 and second low-capacitance area LA2 are positioned slightly lower than in the capacitance distribution of the capacitive part 11a of Sample No. 3. Also, the 800 unit capacitors UC1 to UC800 constituting the capacitive part 11a of Sample No. 6 form a capacitance distribution in which the first low-capacitance area LA1, high-capacitance area HA, and second low-capacitance area LA2 exist, in this order, in the laminating direction, although the first low-capacitance area LA1 and second low-capacitance area LA2 are positioned slightly lower than in the capacitance distribution of the capacitive part 11a of Sample No. 5.

Next, the effects of the present invention are explained after considering the values, etc., shown under the characteristic items in FIG. 8.

Firstly, when the values in the "Cst (nF)" column, "Rst (MΩ)" column and "CRp (ΩF)" column in FIG. 8 are considered, Sample No. 1 has the smallest CR product CRp, despite its capacitance Cst being the greatest, because its insulation resistance Rst is the lowest. Also, Sample No. 2 has the smallest capacitance Cst and therefore its CR product CRp is the second smallest, although its insulation resistance Rst is higher than that of Sample No. 1. On the other hand, with Sample Nos. 3 to 6, a CR product CRp greater than that of Sample No. 2 can be ensured because their insulation resistance Rst is the same as or higher than that of Sample No. 2, although their capacitance Cst is slightly smaller than that of Sample No. 1. In other words, a capacitance distribution like those of the capacitive parts 11a of Sample Nos. 3 to 6, or specifically a capacitance distribution in which the first low-capacitance area LA1, high-capacitance HA, and second low-capacitance area LA2 exist, in this order, in the laminating direction (refer to the thick solid lines in FIGS. 9 and 10), is advantageous in improving the CR product CRp.

Secondly, when the values in the "$\Delta Cb1/Cme$" column and "$\Delta Cb2/Cme$" column in FIG. 8 are considered, $\Delta Cb1/Cme$ and $\Delta Cb2/Cme$ are both 0.15 or greater with all of Sample Nos. 3 to 6. In other words, it is favorable in improving the CR product CRp that the aforementioned capacitance distribution is formed, and also that $\Delta Cb1/Cme$ and $\Delta Cb2/Cme$ satisfy the condition of $0.15 \leq \Delta Cb1/Cme$ and $0.15 \leq \Delta Cb2/Cme$.

Thirdly, when the values in the "Cmax/Cmin" column in FIG. 8 are considered, Cmax/Cmin is 1.4 or greater with all of Sample Nos. 3 to 6. In other words, it is favorable in improving the CR product CRp that the aforementioned capacitance distribution is formed, and also that Cmax and Cmin satisfy the condition of $1.4 \leq Cmax/Cmin$. In addition, Sample Nos. 4 and 5 have a high CR product CRp among Sample Nos. 3 to 6, and when this is taken into consideration, it is more favorable in improving the CR product CRp that Cmax and Cmin satisfy the condition of $1.4 \leq Cmax/Cmin \leq 3.1$.

Next, the specifications and manufacturing methods of Verification Sample Nos. 7 to 10 (multilayer ceramic capacitors) shown in FIG. 11 are explained. It should be noted that Sample No. 3 shown in FIG. 11 is the same as Sample No. 3 shown in FIG. 8.

<Specification and Manufacturing Method of Sample No. 7>

The specifications of Sample No. 7 are the same as the specifications of Sample No. 3. However, the manufacturing method of Sample No. 7 is different from the manufacturing method of Sample No. 3 in that:

In the process of producing an area corresponding to the capacitive part 11a, fewer unit sheets (bearing the internal electrode layer patterns) that had been stamped out of the fourth green sheets were stacked and thermally bonded in both of the applicable steps compared to Sample No. 3, while more unit sheets (bearing the internal electrode layer patterns) that had been stamped out of the second green sheets were stacked and thermally bonded compared to Sample No. 3.

<Specifications and Manufacturing Method of Sample No. 8>

The specifications of Sample No. 8 are the same as the specifications of Sample No. 3. However, the manufacturing method of Sample No. 8 is different from the manufacturing method of Sample No. 3 in that:

In the process of producing an area corresponding to the capacitive part 11a, more unit sheets (bearing the internal electrode layer patterns) that had been stamped out of the fourth green sheets were stacked and thermally bonded in both of the applicable steps compared to Sample No. 7, while fewer unit sheets (bearing the internal electrode layer patterns) that had been stamped out of the second green sheets were stacked and thermally bonded compared to Sample No. 7.

<Specifications and Manufacturing Method of Sample No. 9>

The specifications of Sample No. 9 are the same as the specifications of Sample No. 3. However, the manufacturing method of Sample No. 9 is different from the manufacturing method of Sample No. 3 in that:

In the process of producing an area corresponding to the capacitive part 11a, more unit sheets (bearing the internal electrode layer patterns) that had been stamped out of the fourth green sheets were stacked and thermally bonded in both of the applicable steps compared to Sample No. 3, while fewer unit sheets (bearing the internal electrode layer patterns) that had been stamped out of the second green sheets were stacked and thermally bonded compared to Sample No. 3.

<Specifications and Manufacturing Method of Sample No. 10>

The specifications of Sample No. 10 are the same as the specifications of Sample No. 3. However, the manufacturing method of Sample No. 10 is different from the manufacturing method of Sample No. 3 in that:

In the process of producing an area corresponding to the capacitive part 11a, more unit sheets (bearing the internal electrode layer patterns) that had been stamped out of the fourth green sheets were stacked and thermally bonded in both of the applicable steps compared to Sample No. 9, while fewer unit sheets (bearing the internal electrode layer patterns) that had been stamped out of the second green sheets were stacked and thermally bonded compared to Sample No. 9.

Next, the meanings of the characteristic items shown in FIG. 11, as well as the measurement methods of the values, etc., shown under the respective characteristic items, are explained.

The meanings of, and measurement methods of the values in the "x-y-z" column, "ΔCb1/Cme" column, "ΔCb2/Cme" column, "Cmax/Cmin" column, "Cst (nF)" column, "Rst (MΩ) column and "CRp (ΩF)" column in FIG. 11 are the same as explained earlier by citing FIG. 8 and therefore not explained here. In addition, the "(x+z)/n" column in FIG. 11 indicates the value calculated by dividing the sum (x+z) of the x number of unit capacitors constituting the first low-capacitance area LA1 and the z number of unit capacitors constituting the second low-capacitance area LA2, by the n number (800) of unit capacitors constituting the capacitive part 11a.

Next, the capacitance distributions of the 800 unit capacitors UC1 to UC800 constituting the capacitive parts 11a of Sample Nos. 7 to 10 shown in FIG. 11 are explained by citing FIGS. 12 and 13.

The thick solid line in FIG. 12 is an approximate line plotting the unit capacitances (average of 10) of the 800 unit capacitors UC1 to UC800 constituting the capacitive part 11a of Sample No. 8, showing their capacitance distribution in an easy-to-understand manner. Meanwhile, the thick solid line in FIG. 13 is an approximate line plotting the unit capacitances (average of 10) of the 800 unit capacitors UC1 to UC800 constituting the capacitive part 11a of Sample No. 9, showing their capacitance distribution in an easy-to-understand manner.

As is evident from FIGS. 12 and 13, the capacitance distributions of the 800 unit capacitors UC1 to UC800 constituting the capacitive parts 11a of Sample Nos. 8 to 9 have the first low-capacitance area LA1, high-capacitance area HA, and second low-capacitance area LA2, in this order, in the laminating direction, just like the capacitance distributions of the 800 unit capacitors UC1 to UC800 constituting the capacitive parts 11a of Sample Nos. 3 and 5 shown in FIGS. 9 and 10.

To be specific, the 800 unit capacitors UC1 to UC800 constituting the capacitive part 11a of Sample No. 8 form a capacitance distribution in which the first low-capacitance area LA1 constituted by 29 unit capacitors UC1 to UC29, the high-capacitance area HA constituted by 736 unit capacitors UC33 to UC768 whose unit capacitance is greater than that of the 29 unit capacitors UC1 to UC29, and the second low-capacitance area LA2 constituted by 29 unit capacitors UC772 to UC800 whose unit capacitance is smaller than that of the 736 unit capacitors UC33 to UC768, exist, in this order, in the laminating direction.

In this capacitance distribution, a first variable-capacitance part B1 constituted by five continuous unit capacitors UC29 to UC33 exists between the first low-capacitance area LA1 and high-capacitance area HA, while a second variable-capacitance part B2 constituted by five continuous unit capacitors UC768 to UC772 exists between the high-capacitance area HA and second low-capacitance area LA2. Although not shown in FIG. 12, the largest unit capacitance difference ΔCb1 (refer to FIG. 11) in the first variable-capacitance part B1 represents the largest value of unit capacitance difference between given two adjacent unit capacitors among the five unit capacitors UC29 to UC33 constituting the first variable-capacitance part B1, as described above. On the other hand, as described above, the largest unit capacitance difference ΔCb2 (refer to FIG. 11) in the second variable-capacitance part B2 represents the largest value of unit capacitance difference between given two adjacent unit capacitors among the five unit capacitors UC768 to UC772 constituting the second variable-capacitance part B2.

Meanwhile, the 800 unit capacitors UC1 to UC800 constituting the capacitive part 11a of Sample No. 9 form a capacitance distribution in which the first low-capacitance area LA1 constituted by 118 unit capacitors UC1 to UC118, the high-capacitance area HA constituted by 560 unit capacitors UC121 to UC680 whose unit capacitance is greater than that of the 118 unit capacitors UC1 to UC118, and the second low-capacitance area LA2 constituted by 117 unit capacitors UC684 to UC800 whose unit capacitance is smaller than that of the 560 unit capacitors UC121 to UC680, exist, in this order, in the laminating direction.

In this capacitance distribution, a first variable-capacitance part B1 constituted by four continuous unit capacitors UC118 to UC121 exists between the first low-capacitance area LA1 and high-capacitance area HA, while a second variable-capacitance part B2 constituted by five continuous unit capacitors UC680 to UC684 exists between the high-capacitance area HA and second low-capacitance area LA2. Although not shown in FIG. 13, the largest unit capacitance difference ΔCb1 (refer to FIG. 11) in the first variable-capacitance part B1 represents the largest value of unit capacitance difference between given two adjacent unit capacitors among the four unit capacitors UC118 to UC121 constituting the first variable-capacitance part B1, as described above. On the other hand, as described above, the largest unit capacitance difference ΔCb2 (refer to FIG. 11) in the second variable-capacitance part B2 represents the largest value of unit capacitance difference between given two adjacent unit capacitors among the five unit capacitors UC680 to UC684 constituting the second variable-capacitance part B2.

While not illustrated, the 800 unit capacitors UC1 to UC800 constituting the capacitive part 11a of Sample No. 7 form a capacitance distribution in which the first low-capacitance area LA1, high-capacitance area HA, and second low-capacitance area LA2 exist, in this order, in the laminating direction, although the first low-capacitance area LA1 and second low-capacitance area LA2 are narrower than in the capacitance distribution of the capacitive part 11a of Sample No. 8 and the high-capacitance area HA is wider than in the capacitance distribution of the capacitive part 11a of Sample No. 8. Also, the 800 unit capacitors UC1 to UC800 constituting the capacitive part 11a of Sample No. 10 form a capacitance distribution in which the first low-capacitance area LA1, high-capacitance area HA, and second low-capacitance area LA2 exist, in this order, in the laminating direction, although the first low-capacitance area LA1 and second low-capacitance area LA2 are wider than in the capacitance distribution of the capacitive part 11a of Sample No. 9 and the high-capacitance area HA is narrower than in the capacitance distribution of the capacitive part 11a of Sample No. 9.

Next, the effects of the present invention other than those mentioned earlier are explained after considering the values, etc., shown under the characteristic items in FIG. 11.

Firstly, when the values in the "(x+z)/n" column in FIG. 11 are considered, (x+z)/n is 0.05 or greater with all of Sample Nos. 7 to 10 and 3. In other words, it is favorable in improving the CR product CRp that the aforementioned capacitance distribution is formed, and also that (x+z) and n satisfy the condition of $0.05 \leq (x+z)/n$. In addition, Sample Nos. 8, 9, and 3 have a high CR product CRp among Sample Nos. 7 to 10 and 3, and when this is taken into consideration, it is more favorable in improving the CR product CRp that (x+z) and n satisfy the condition of $0.07 \leq (x+z)/n \leq 0.30$.

It should be noted that the aforementioned manufacturing methods of Verification Sample Nos. 3 to 10 combined the method of producing third green sheets using holmium oxide of higher concentration (sintering inhibitor) while also producing fourth green sheets that are third green sheets with internal electrode layer patterns formed on top, in order to positively achieve the capacitance distribution similar to that shown with the thick solid lines in FIGS. 9, 10, 12 and 13, with the method of increasing the speed of raising the temperature when sintering unsintered chips; however, it is amply possible that the aforementioned capacitance distribution can be achieved by adopting other methods.

For example, the aforementioned capacitance distribution can also be achieved by using, among others: (1) a method where a rare earth oxide other than holmium oxide is used as the sintering inhibitor; (2) a method where green sheets that will become the dielectric layers 11a2 of unit capacitors constituting the high-capacitance area HA are formed by mixing in silica, glass compound, or other sintering aid and then sintered by raising the temperature at a low to medium rate (600° C./h to 5000° C./h); (3) a method where green sheets that will become the dielectric layers 11a2 of unit capacitors constituting the first low-capacitance area LA1 and second low-capacitance area LA2 are formed without a sintering inhibitor and then sintered by raising the temperature at a high rate (5000° C./h to 10000° C./h); or (4) a method that combines method (2) and method (3) above.

Also, while the aforementioned specifications of Verification Sample Nos. 3 to 10 indicated that capacitive part 11a was constituted by 800 unit capacitors, the CR product can be improved even when the number (n) of unit capacitors constituting the capacitive part 11a is less than 800 or more than 800, so long as the aforementioned capacitance distribution is formed. In addition, the aforementioned capacitance distribution can be formed so long as the number (x) of unit capacitors constituting the first low-capacitance area LA1 is 2 or greater, the number (y) of unit capacitors constituting the high-capacitance area HA is 2 or greater, the number (z) of unit capacitors constituting the second low-capacitance area LA2 is 2 or greater, and the number of unit capacitors constituting the first variable-capacitance part B1 and the second variable-capacitance part B2 is 2 or greater, and based on this, it can be said that the number (n) of unit capacitors constituting the capacitive part 11a needs only to satisfy the condition of $n \geq x+y+z$.

Furthermore, while the aforementioned specifications of Verification Sample Nos. 3 to 10 indicated that the multilayer ceramic capacitor satisfied the condition of Length L>Width W=Height H, the CR product can be improved even with a multilayer ceramic capacitor satisfying the condition of Length L>Width W>Height H, or the condition of Length L>Height H>Width W, so long as the aforementioned capacitance distribution is formed.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2014-157395, filed Aug. 1, 2014 and No. 2015-121930, filed Jun. 17, 2015, each disclosure of which is incorporated herein by reference in its entirety (including any and all particular combinations of the features disclosed therein) for some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor having multiple internal electrode layers stacked with dielectric layers sandwiched in between, with the multiple internal electrode layers connected alternately to a pair of external electrodes, wherein, when a part constituted by two of the internal electrode layers positioned adjacent to each other in a laminating direction and the dielectric layer present between these two internal electrode layers is considered a unit capacitor, then the multilayer ceramic capacitor consists of an n number ($n \geq x+y+z$, where x, y and z are each an integer of 2 or greater) of unit capacitors as a capacitive part;
said n number of unit capacitors constituting:
   (1) a first low-capacitance area constituted by an x number of unit capacitors;
   (2) a high-capacitance area constituted by a y number of unit capacitors whose unit capacitance is greater than that of the x number of unit capacitors;
   (3) a second low-capacitance area constituted by a z number of unit capacitors whose unit capacitance is smaller than that of they number of unit capacitors;
   (4) a first variable-capacitance part which is present between the first low-capacitance area and the high-capacitance area, and which includes two or more adjacent unit capacitors whose unit capacitance difference is larger than a unit capacitance difference of any two adjacent unit capacitors in the first low-capacitance area and the high-capacitance area on a first low-capacitance area side; and
   (5) a second variable-capacitance part which is present between the high-capacitance area and the second low-capacitance area, and which includes two or more adjacent unit capacitors whose unit capacitance difference between any two adjacent unit capacitors of the two or more adjacent unit capacitors is larger than a unit capacitance difference of any two adjacent unit capacitors in the high-capacitance area and the second low-capacitance area on a second low-capacitance area side,
wherein the capacitive part consists of the first low-capacitance area, the high-capacitance area, the second low-capacitance area, the first variable-capacitance part, and the second variable-capacitance part, and
wherein all internal electrode layers constituting the capacitive part have a shape of equivalent profile.

2. A multilayer ceramic capacitor according to claim 1, wherein, when an average unit capacitance of the n number of unit capacitors is given as Cme, a largest unit capacitance difference in the first variable-capacitance part is given as $\Delta Cb1$, and a largest unit capacitance difference in the second variable-capacitance part is given as $\Delta Cb2$, then Cme, $\Delta Cb1$, and $\Delta Cb2$ satisfy conditions of $0.15 \leq \Delta Cb1/Cme$ and $0.15 \leq \Delta Cb2/Cme$.

3. A multilayer ceramic capacitor according to claim 1, wherein, when a largest unit capacitance of the n number of unit capacitors is given as Cmax and a smallest unit capacitance is given as Cmin, then Cmax and Cmin satisfy a condition of $1.4 \leq Cmax/Cmin$.

4. A multilayer ceramic capacitor according to claim 2, wherein, when a largest unit capacitance of the n number of unit capacitors is given as Cmax and a smallest unit capacitance is given as Cmin, then Cmax and Cmin satisfy a condition of $1.4 \leq Cmax/Cmin$.

5. A multilayer ceramic capacitor according to claim 3, wherein the condition in claim 3 is $1.4 \leq Cmax/Cmin \leq 3.1$.

6. A multilayer ceramic capacitor according to claim 4, wherein the condition in claim 4 is $1.4 \leq Cmax/Cmin \leq 3.1$.

7. A multilayer ceramic capacitor according to claim 1, wherein n and a sum (x+z) of x and z satisfy a condition of $0.05 \leq (x+z)/n$.

8. A multilayer ceramic capacitor according to claim 2, wherein n and a sum (x+z) of x and z satisfy a condition of $0.05 \leq (x+z)/n$.

9. A multilayer ceramic capacitor according to claim 3, wherein n and a sum (x+z) of x and z satisfy a condition of $0.05 \leq (x+z)/n$.

10. A multilayer ceramic capacitor according to claim 4, wherein n and a sum (x+z) of x and z satisfy a condition of $0.05 \leq (x+z)/n$.

11. A multilayer ceramic capacitor according to claim 5, wherein n and a sum (x+z) of x and z satisfy a condition of $0.05 \leq (x+z)/n$.

12. A multilayer ceramic capacitor according to claim 6, wherein n and a sum (x+z) of x and z satisfy a condition of $0.05 \leq (x+z)/n$.

13. A multilayer ceramic capacitor according to claim 7, wherein the condition in claim 7 is $0.07 \leq (x+z)/n \leq 0.30$.

14. A multilayer ceramic capacitor according to claim 1, wherein all internal electrode layers constituting the capacitive part have an equivalent thickness.

15. A multilayer ceramic capacitor according to claim 1, wherein all internal electrode layers constituting the capacitive part have a thickness of 1 μm or less.

16. A multilayer ceramic capacitor having multiple internal electrode layers stacked with dielectric layers sandwiched in between, with the multiple internal electrode layers connected alternately to a pair of external electrodes, wherein, when a part constituted by two of the internal electrode layers positioned adjacent to each other in a laminating direction and the dielectric layer present between these two internal electrode layers is considered a unit capacitor, then the multilayer ceramic capacitor has an n number ($n \geq x+y+z$, where x, y and z are each an integer of 2 or greater) of unit capacitors as a capacitive part;
said n number of unit capacitors constituting:
   (1) a first low-capacitance area constituted by an x number of unit capacitors;
   (2) a high-capacitance area constituted by a y number of unit capacitors whose unit capacitance is greater than that of the x number of unit capacitors;
   (3) a second low-capacitance area constituted by a z number of unit capacitors whose unit capacitance is smaller than that of they number of unit capacitors;
   (4) a first variable-capacitance part which is present between the first low-capacitance area and the high-capacitance area, and which includes two or more adjacent unit capacitors whose unit capacitance difference is larger than a unit capacitance difference of any two adjacent unit capacitors in the first low-capacitance area and the high-capacitance area on a first low-capacitance area side; and (5) a second variable-capacitance part which is present between the high-capacitance area and the second low-capacitance area, and which includes two or more adjacent unit capacitors whose unit capacitance difference between any two adjacent unit capacitors of the two or more adjacent unit capacitors is larger than a unit capacitance difference of any two adjacent unit capacitors in the high-capacitance area and the second low-capacitance area on a second low-capacitance area side, wherein the capacitive part consists of the first low-capacitance area, the high-capacitance area, the second low-capacitance area, the first variable-capacitance part, and the second variable-capacitance part, wherein all internal electrode layers constituting the capacitive part have a shape of equivalent profile, and wherein n and a sum (x+z) of x and z satisfy a condition of $0.07 \leq (x+z)/n \leq 0.30$.

17. A multilayer ceramic capacitor according to claim 16, wherein, when an average unit capacitance of the n number of unit capacitors is given as Cme, a largest unit capacitance difference in the first variable-capacitance part is given as $\Delta Cb1$, and a largest unit capacitance difference in the second variable-capacitance part is given as $\Delta Cb2$, then Cme, $\Delta Cb1$, and $\Delta Cb2$ satisfy conditions of $0.15 \leq \Delta Cb1/Cme$ and $0.15 \leq \Delta Cb2/Cme$.

18. A multilayer ceramic capacitor according to claim 16, wherein, when a largest unit capacitance of the n number of unit capacitors is given as Cmax and a smallest unit capacitance is given as Cmin, then Cmax and Cmin satisfy a condition of $1.4 \leq Cmax/Cmin$.

19. A multilayer ceramic capacitor according to claim 17, wherein, when a largest unit capacitance of the n number of unit capacitors is given as Cmax and a smallest unit capacitance is given as Cmin, then Cmax and Cmin satisfy a condition of $1.4 \leq Cmax/Cmin$.

20. A multilayer ceramic capacitor according to claim 18, wherein the condition in claim 3 is $1.4 \leq Cmax/Cmin \leq 3.1$.

* * * * *

UNITED STATES PATENT AND TRADEMARK OFFICE
CERTIFICATE OF CORRECTION

| | | |
|---|---|---|
| PATENT NO. | : 10,468,189 B2 | Page 1 of 1 |
| APPLICATION NO. | : 14/805426 | |
| DATED | : November 5, 2019 | |
| INVENTOR(S) | : Koichiro Morita and Kenji Saito | |

It is certified that error appears in the above-identified patent and that said Letters Patent is hereby corrected as shown below:

In the Claims

At Column 17, Line 38, in Claim 1, please insert a space between "the" and "y".

At Column 18, Line 63, in Claim 16, please insert a space between "the" and "y".

Signed and Sealed this
Twenty-first Day of January, 2020

Andrei Iancu
*Director of the United States Patent and Trademark Office*